United States Patent [19]
Alonzo, Jr. et al.

[11] Patent Number: 5,658,069
[45] Date of Patent: Aug. 19, 1997

[54] TWIN REFLECTOR OSCILLATING MECHANISM

[75] Inventors: Alexander A. Alonzo, Jr., Westbrook; Geoffrey E. Marsh, Old Lyme, both of Conn.

[73] Assignee: Whelen Engineering Company, Inc., Chester, Conn.

[21] Appl. No.: 617,315

[22] Filed: Mar. 18, 1996

[51] Int. Cl.$^6$ ............................................. F21V 21/30
[52] U.S. Cl. .................... 362/237; 362/35; 362/74; 362/287; 74/45; 340/473
[58] Field of Search .................... 362/35, 74, 66, 362/250, 239, 272, 286, 287, 289, 420, 423, 69, 238; 340/471, 472, 473; 74/45

[56] References Cited

U.S. PATENT DOCUMENTS

| | | | |
|---|---|---|---|
| 4,387,362 | 6/1983 | Gosswiller | 362/35 |
| 4,511,880 | 4/1985 | Stanuch | 362/35 |
| 5,091,828 | 2/1992 | Jincks et al. | 362/35 |
| 5,385,062 | 1/1995 | Menke | 362/35 |
| 5,426,417 | 6/1995 | Stanuch | 362/35 |
| 5,537,298 | 7/1996 | Menke | 362/35 |

*Primary Examiner*—Ira S. Lazarus
*Assistant Examiner*—Thomas M. Sember
*Attorney, Agent, or Firm*—Chilton, Alix & Van Kirk

[57] ABSTRACT

A warning light assembly includes a pair of simultaneously rotatable light beam generators. The rotation of the output shaft of a single drive motor about a first axis is converted to oscillatory motion of the light beam generators about a pair of spaced, parallel axes by a mechanical drive train which includes an eccentric drive for producing reciprocal linear motion in two opposite directions.

20 Claims, 2 Drawing Sheets

TWIN REFLECTOR OSCILLATING MECHANISM

BACKGROUND OF THE INVENTION

1. Field of the Invention

The present invention relates to warning lights for emergency vehicles and the like and, particularly, to the generation of a highly conspicuous pattern of light flashes to enhance the visibility of a vehicle or other object on which a warning light assembly is mounted. More specifically, this invention is directed to a reflector drive mechanism and, especially, to an electro-mechanical drive for simultaneously imparting oscillating motion to a pair of directional warning lights. Accordingly, the general objects of the present invention are to provide novel and improved methods and apparatus of such character.

2. Description of the Prior Art

While not limited thereto in its utility, the present invention is particularly well-suited for employment in warning light systems for emergency vehicles. Emergency vehicle warning light systems which provide an attention commanding pattern of flashing lights are well-known in the art. Such existing warning light systems employ light sources which are periodically energized, i.e., gaseous discharge tubes or incandescent lamps, mechanically driven lights or a combination of both types of directional light source. In the case of mechanically driven lights, a reflector assembly may be caused to move relative to a stationary light emitter, i.e., the reflector will be caused to rotate about an axis on which the light source is mounted, or a combination light emitter and reflector will be caused to rotate as a unit. The latter type of mechanically driven directional light source is preferred because the light emitter may be more accurately positioned relative to the focal point(s) of the reflector and thus the available light is most efficiently utilized. While full rotational motion is often highly desirable because of the 360° light radiation pattern which may be obtained, rotational motion of a combination light emitter and reflector requires the added complexity of a commutator to couple direct current electrical energy between the stationary and rotating parts of the light assembly. Lights which are caused to undergo oscillatory motion do not require a commutator and thus are characterized by enhanced reliability and longer service life.

Oscillatory motion, however, presents the problem of how to generate the requisite alternate clockwise and counter-clockwise rotation of the light in an efficient and cost effective manner. Drive motor reversal, for example, can be achieved only through the use of relative complex and thus expensive electronics. Previously proposed mechanical techniques for producing changes in the rotational direction of a warning light were complex and volumetrically inefficient.

In order to obtain the ability to "cover" a full 360° field of illumination, oscillating warning lights must be used in pairs. Even when the requisite field is less than 360°, the coupling of lights in pairs may be employed to produce a desired flash pattern and/or illumination field. Such paired operation has, in the past, required relatively complex synchronization and/or coupling mechanisms. Synchronized/coupled warning light operation has often resulted in the use of multiple drive motors, i.e., one motor per light. Also, previously available coupling mechanisms were characterized by the inability to easily adjust the relative orientations of the coupled lights.

An oscillating warning light optimally has the attributes of reliability, lack of complexity, ease of individual adjustment of a pair of coupled lights, energy efficiency, compactness and reasonable cost.

SUMMARY OF THE INVENTION

The present invention is a novel and improved warning light assembly which possesses all of the above-listed attributes. The invention also encompasses a unique twin reflector oscillating mechanism for use in such a warning light.

Apparatus in accordance with a preferred embodiment of the invention comprises a pair of rotatably mounted light beam generators, the light beam generators each including a reflector and associated light emitter. The light beam generators are coupled to, and thus driven by, a common oscillating mechanism which employs a single drive motor. A worm gear on the motor output shaft drives a main gear about an axis which is parallel to the axes of rotation of the light beam generators. The main gear is provided with an upwardly projecting, eccentrically mounted, post which engages a double-ended rack. The rack consists of a central portion, having an elongated drive slot which is engaged by the post, and a pair of parallel linear gears which extend in opposite directions from opposite ends of the central portion. The opposed linear gears also extend in directions which are generally transverse to the axis of the drive slot. The linear gears engage drive gears mounted on respective of the light beam generators. Rotation of the motor output shaft about a first axis will cause the main gear to rotate about a second axis. As a result of the driving action of the post in the slot on the double ended rack, the two gears of the rack will be caused to linearly reciprocate. This linear motion is translated to alternate clockwise and counter-clockwise rotational motion of the light beam generator drive gears about their axes. The rotation of the two associated light beam generators will be in opposite directions.

In order to further enhance the conspicuity of a warning light in accordance with the present invention, a suitably shaped, stationary reflector may be positioned between the light beam generators to redirect light which would otherwise be inefficiently used as a result of light focused by one reflector at least in part being intercepted by a rearwardly facing surface of the other reflector.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the two figures and in which.

DESCRIPTION OF THE DISCLOSED EMBODIMENT

Figure 1:
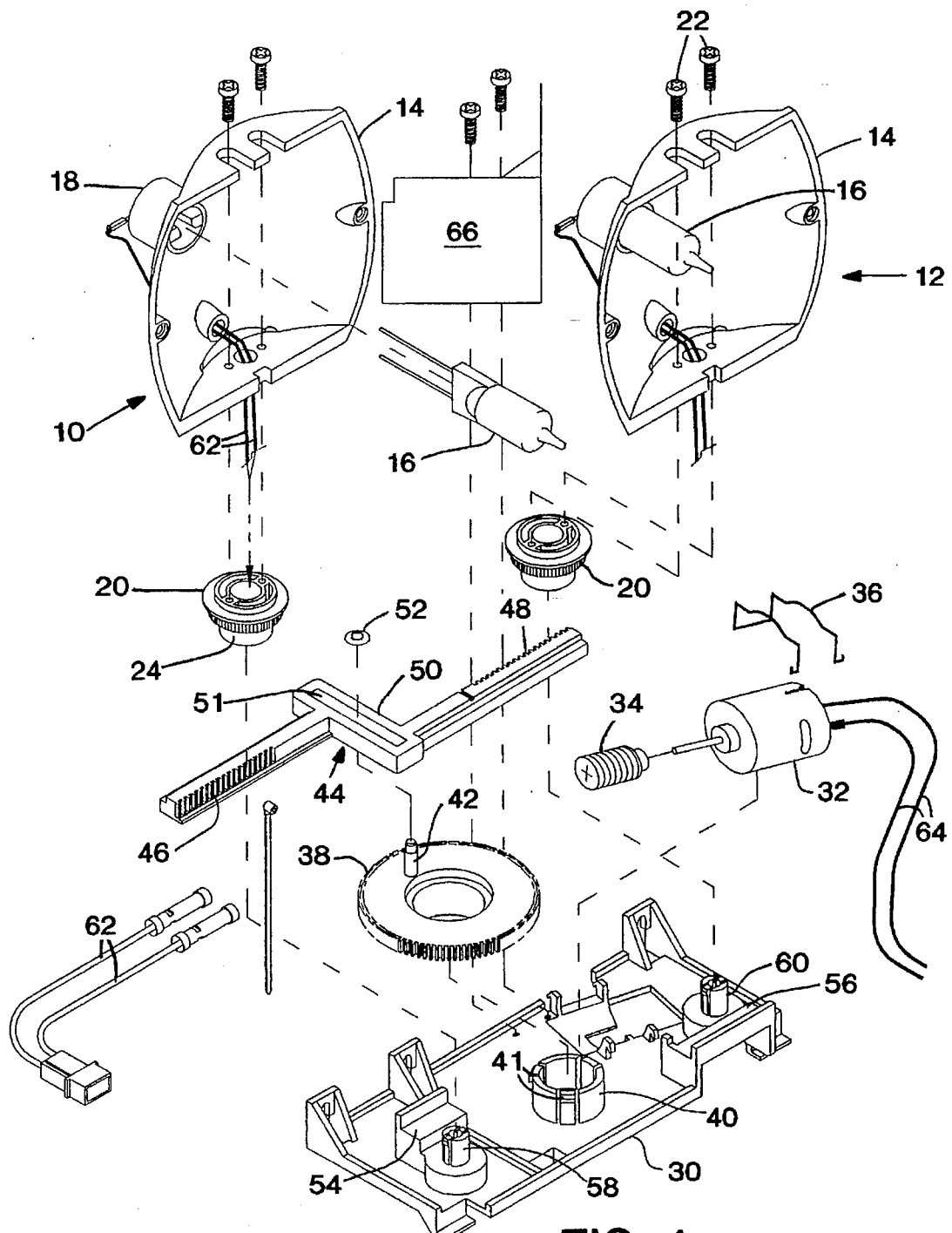
FIG. 1 is a schematic, exploded perspective view of a twin reflector oscillating mechanism in accordance with the present invention, FIG. 1 also depicting a pair of driven light beam generators and a stationary reflector.
Figure 2:
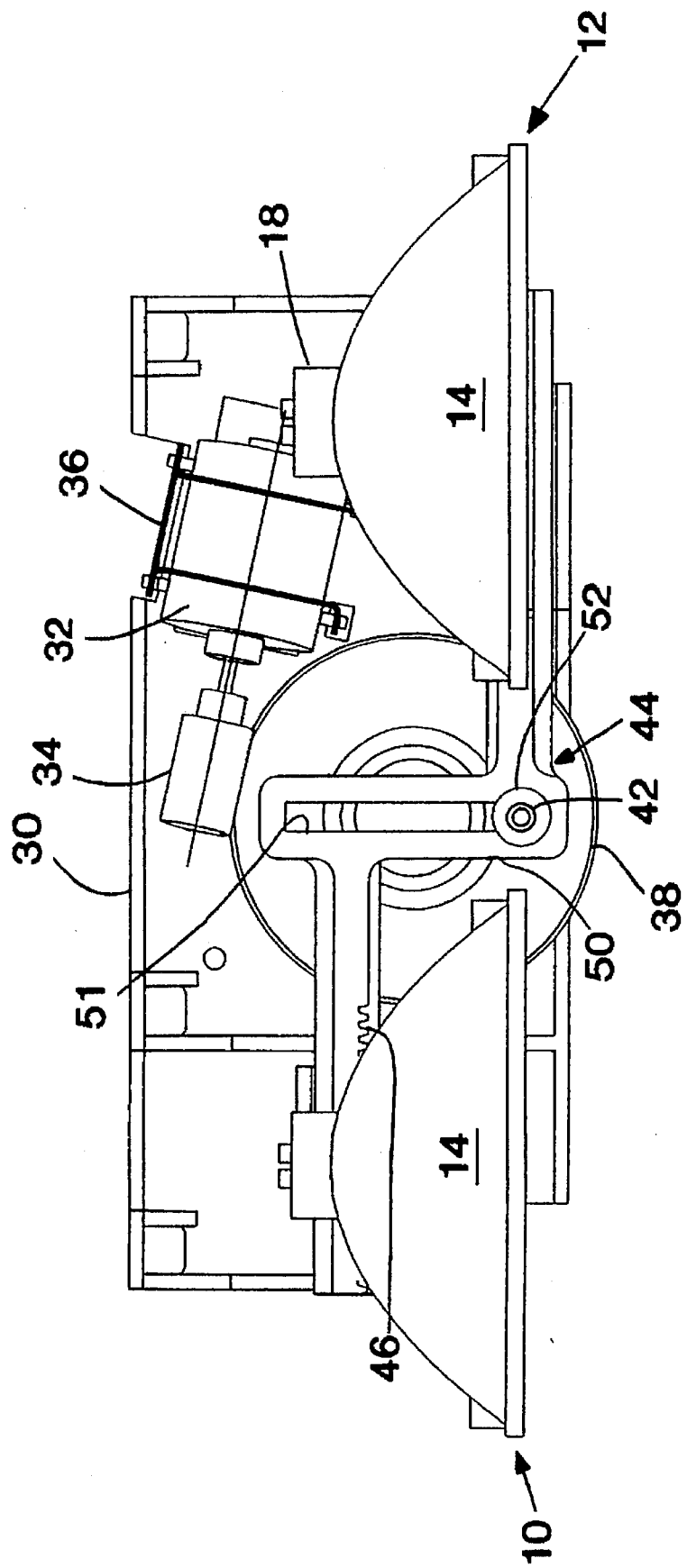
FIG. 2 is a top view of the mechanism of FIG. 1 in the assembled condition but with the stationary reflector omitted.

Referring jointly to FIGS. 1 and 2, a pair of light beam generators which are to be caused to oscillate are respectively and generally indicated at 10 and 12. The light beam generators each include a reflector 14 and a light emitter 16. In the disclosed embodiment, the light emitters comprise halogen lamps which will, when the warning light is in use, be continuously energized. Each of the reflectors 14 includes a socket 18 for receiving and supporting a lamp 16. The reflectors will be molded plastic parts which will be metallized as necessary to reflect light emitted by a lamp 16. The reflectors 14 each define a reflective surface which redirects light emitted from lamp 16 so as to produce a desired radiation pattern. In the least complicated case, the reflective surface of the reflector will have the shape of a portion of parabaloid of a revolution about an axis and the filament of lamp 16 will be located at the focal point of the parabola. Accordingly, the reflected light will be collimated into a light beam.

Those skilled in the art will understand that the light beam generators 10 and 12 will customarily be mounted within a housing, a light bar for example, and the generated light beams will be passed through a lens which may alter the light radiation pattern.

A drive gear 20 is mounted to the base of each of the reflectors 14. In the disclosed embodiment, a pair of screws 22 will pass through the base of each reflector 14 and engage the gears 20. The gears 20 will be provided with an axial opening which is extended by a tubular projection 24. The gears 20 will be fabricated from a suitable plastic such as, for example, Nylon.

The means for driving gears 20, to thereby impart oscillatory motion to the light beam generators 10, 12 about the axes of the gears, is mounted on a base plate 30. The power source comprises an electric motor, indicated at 32, having a worm gear 34 affixed to its rotary output shaft. Motor 32 is secured to base plate 30 by means of a bale strap type of retainer 36.

Worm gear 34 meshes with a main drive gear 38 which is mounted for rotation about the axis of a tubular post 40 which is integral with and extends from base plate 30. Gear 38 is provided with a stepped central opening as may be seen from FIG. 1. The minimum diameter of this opening is complementary to the outer diameter of the tubular post 40. Gear 38 is retained on post 40 by a plurality of resilient tabs 41 on the post which snap over the shoulder defined by the junction of the two portions of the central opening of gear 38 when the gear is installed on post 40. Gear 38 is thus freely rotatable about post 40.

A drive pin or post 42 extends outwardly from gear 38 in a direction which is parallel to the axis of gear rotation. Drive pin 42 is offset from the axis of rotation of gear 38 and thus defines an eccentric drive.

Drive pin 42 cooperates with a rack member indicated generally at 44. Rack member 44 includes a pair of racks, i.e., linear gears 46, 48, which extend in opposite directions from opposite ends of a central portion 50 having a longitudinal slot 51. The diameter of drive pin 42 approximately equals the width of the slot 51 in central portion 50 of rack member 44 and the rack member is captured in driving engagement with pin 42 by means of a retainer 52 which engages the top of pin 42. The racks 46 and 48 of rack member 44 are supported for movement on respective shelves 54 and 56 provided on base plate 30. Racks 46 and 48 are parallel to one another and are oriented transversely with respect to the longitudinal axis of slot 51.

The gears 20 of the light beam generators 10 and 12 are supported for rotation about respective tubular hubs 58 and 60 which are also integral with base 30. As so supported, the peripheral teeth on gears 20 engage respective of the racks 46, 48.

Current for energizing the lamps 16 is delivered to the sockets 18 by means of conductors 62 which pass through the tubular hubs 58, 60 and the tubular central portions of the gears 20. Current for energizing motor 32 is supplied by means of conductors 64.

Rotational motion of the output shaft of motor 32 will cause rotation of worm gear 34 about a first axis which may, for purposes of explanation, be considered to be horizontally oriented. Worm gear 34 meshes with main drive gear 38 and thus causes gear 38 to rotate about a second axis which, in the example being described, is vertically oriented. Rotation of gear 38, through the driving connection established between pin 42 and the slot 51 in the central portion 50 of rack member 44, will impart back and forth linear motion to the racks 46 and 48. Racks 46 and 48 engage the gears 20 on the light generators 10, 12 and thus cause these gears to rotate about spatially separated vertical axes. Through judicious selection of the gear ratios and diameters and the length of the racks 46 and 48, each of the light generators can be caused to rotate through an arc of slightly less than 180°. Accordingly, if desired, facing the light beam generators in opposite directions will effectively produce a light source which sweeps through an angle of almost 360°. By facing both beam generators in the same direction, as shown in FIGS. 1 and 2, a highly visible light pattern comprising a pair of beams which sweep though overlapping fields in arcs of almost 180° is provided.

The individual light generators may also be easily "aimed" by merely disengaging a gear 20 from a cooperating rack, turning the light generator until the desired orientation relative to the other light generator is achieved, and thereafter reengaging the gear 20 with the rack mechanism. For example, in the environment of an end of a vehicle roof mounted light bar, the outboard light generator may be "aimed" to the side while the coupled light generator will be "aimed" forwardly, i.e., the midpoints of the arcs through which the generated light beams are swept will be transversely related.

A wedge shaped mirror 66 may be supported from base plate 30 so as to be positioned between the oscillating light beam generators 10, 12. Accordingly, in the forwardly facing arrangement shown, as each beam generator approaches its limit of motion in the direction of the other beam generator, the emitted and reflected light will be intercepted by a reflective surface on reflector 66 and redirected toward the front of the assembly. Such redirected light has been found to significantly enhance the conspicuosity of the warning light assembly.

While a preferred embodiment has been shown and described, various modifications and substitutions may be made thereto without departing from the spirit and scope of the invention. Accordingly, it is to be understood that the present invention has been described byway of illustration and not limitation.

What is claimed is:

1. A warning light assembly comprising:
   a first light beam generator, said first beam generator including a reflector and an associated light emitter;
   a second light beam generator, said second beam generator including a reflector and an associated light emitter;
   means supporting said light beam generators for rotation about a pair of spatially displaced axes, said axes being substantially parallel to one another and defining a first plane; and
   means for simultaneously imparting oscillatory motion to said light beam generators, said motion imparting means including:
   a drive motor, said motor having a rotatable output shaft;

first gear means coupled to said motor output shaft for converting the motion of said motor output shaft to rotational motion about a third axis, said third axis being oriented substantially parallel to said pair of axes;

means for translating said rotational motion about said third axis to reciprocal linear motion in a pair of opposite directions, said directions of linear motion defining a second plane which is oriented generally transversely with respect to said first plane; and means coupling said translating means at two spatially displaced points to said light beam generators, said coupling means changing said reciprocal linear motion to oscillatory motion of said light beam generators, said points being respectively located on opposite sides of said third axis.

2. The warning light assembly of claim 1 wherein said first gear means comprises:

a main drive gear; and a worm gear on said drive motor output shaft, said worm gear engaging said main drive gear.

3. The warning light assembly of claim 2 wherein said translating means comprises:

eccentric drive means connected to said main drive gear.

4. The warning light assembly of claim 3 wherein said eccentric drive means comprises:

rack means, said rack means having a slotted central portion and a pair of linear gears, said linear gears extending in opposite directions from said slotted central portion; and drive pin means affixed to said main gear, said drive pin means engaging said rack means slotted central portion.

5. The warning light assembly of claim 4 wherein said supporting means comprises:

base means;

a pair of spatially displaced hubs which are integral with said base means, said hubs defining said pair of axes; and means defining a pair of shelves for supporting said linear gears during motion thereof.

6. The warning light assembly of claim 5 wherein said supporting means further comprises:

axle means integral with said base, said axle means defining said third axis, said main gear means being captured on said axle means.

7. The warning light assembly of claim 6 wherein said drive motor is mounted on said base.

8. The warning light assembly of claim 7 wherein conductors for supplying energizing current to said light emitters extend through said hubs.

9. The warning light assembly of claim 5 wherein said means coupling said translating means linear gears to said light beam generators comprises:

a drive gear affixed to each of said light beam generator reflectors, said drive gears being mounted on said hubs.

10. The warning light assembly of claim 9 wherein each of said light beam generator reflectors at least in part defines a parabaloid of revolution about an axis, and wherein said light emitters are supported from respective reflector so as to at least in part lie on the focal point of said parabaloid of revolution.

11. The warning light assembly of claim 10 further comprising:

a stationary reflector positioned generally intermediate said light beam generators.

12. The warning light assembly of claim 11 wherein said drive motor is mounted on said base.

13. The warning light assembly of claim 12 wherein conductors for supplying energizing current to said light emitters extend through said hubs.

14. The warning light assembly of claim 1 wherein said translating means comprises:

rack means, said rack means including a central portion and a pair of arms extending in opposite directions from opposite ends of said central portion, each of said arms in part defining a linear gear, said arms being oriented parallel with respect to one another, said central portion being provided with an elongated drive slot; and means coupling said rack means to said main gear, said coupling means being rigidly affixed to said main gear at a point radially displaced from said third axis, said coupling means slidably engaging said drive slot.

15. The warning light assembly of claim 1 wherein each of said light beam generator reflectors at least in part defines a parabaloid of revolution about an axis, and wherein said light emitters are supported from their respective reflector so as to at least in part lie on a focal point of said parabaloid of revolution.

16. The warning light assembly of claim 1 wherein said means coupling said translating means to said light beam generators comprises:

a drive gear affixed to each of said light beam generator reflectors; and a hub on said supporting means, said gears being rotatably mounted on said hubs.

17. The warning light assembly of claim 1 further comprising:

a stationary reflector positioned generally intermediate said light beam generators.

18. The warning light assembly of claim 1 wherein said supporting means comprises:

base means;

a pair of hubs integral with said base means, said hubs being spatially displaced and defining said pair of axes.

19. The warning light assembly of claim 18 wherein said first gear means comprises:

a main drive gear; and a gear affixed to said motor output shaft, said gear affixed to said motor output shaft engaging said main drive gear and causing rotation thereof about said third axis.

20. The warning light assembly of claim 19 wherein said supporting means further comprises:

means defining a stationary axle for said main gear, said axle defining means being integral with said base.

* * * * *